O. E. SMITH.
PAPER FRUIT CONTAINER.
APPLICATION FILED MAY 3, 1915.

1,155,524.

Patented Oct. 5, 1915.

WITNESSES:
John A. Naismith
J. B. Cambers

INVENTOR
Ona E. Smith
BY F. C. Bates
HER ATTORNEY

UNITED STATES PATENT OFFICE.

ONA E. SMITH, OF SAN JOSE, CALIFORNIA.

PAPER FRUIT-CONTAINER.

1,155,524. Specification of Letters Patent. Patented Oct. 5, 1915.

Application filed May 3, 1915. Serial No. 25,533.

*To all whom it may concern:*

Be it known that I, ONA E. SMITH, a citizen of the United States, and resident of San Jose, in the county of Santa Clara and State of California, have invented a certain new and useful Improvement in Paper Fruit-Containers, of which the following is a specification.

My invention relates to plaited paper fruit containers for preserving fruit, and the object of my invention is to produce a receptacle of the character mentioned reinforced in such a manner as to make it capable of holding jellies, preserves, etc., when said receptacle is sealed with paraffin.

Figure 1:
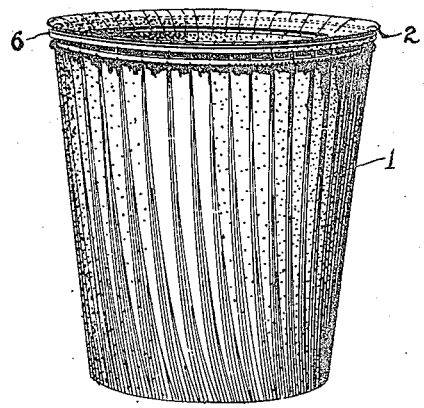
Figure 2:
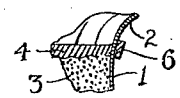

In the drawings,—Figure 1 is a perspective view of my improved paper fruit container. Fig. 2 is a fragmentary section through the upper portion of my container.

Similar characters of reference refer to similar parts throughout the several views.

Referring now to the drawings, 1 indicates a plaited paper container which has been rendered impervious to liquids by coating the same with paraffin, the upper edge of said container 1 having an outwardly curving lip as shown at 2.

At 3 is indicated preserved fruit in container 1 covered with a layer of paraffin 4. The paraffin 4 is poured upon the surface of fruit 3 while hot and in a liquid state. The hot paraffin coming in contact with the sides of container 1 melts the paraffin coating of the same and thereby, upon solidifying, becomes an integral part of said container. If no reinforcement is used the container will spread at the top thereby destroying the original shape of the container and making it difficult to maintain a perfect bond between the container and the paraffin poured in to form a top. This is especially true if the container is frequently handled after being filled and sealed. To obviate these difficulties I place an elastic band 6 around said container 1 in approximately the position indicated in detail in Fig. 2, said band being sufficiently strong to reinforce container 1 and assist the same in keeping its original shape under all ordinary circumstances.

Having thus described my invention, what I claim as new and desire to secure by Letters Patent, is,—

The combination with a paraffined plaited paper fruit container having an outwardly curving upper edge of an elastic band positioned around said container a distance below said upper edge.

In testimony whereof I have hereunto affixed my signature in presence of two subscribing witnesses.

ONA E. SMITH.

Witnesses:
H. J. B. WRIGHT,
C. D. HARVEY.